(12) United States Patent
Hamada et al.

(10) Patent No.: US 9,104,379 B2
(45) Date of Patent: Aug. 11, 2015

(54) ELECTRONIC APPARATUS

(71) Applicant: Kabushiki Kaisha Toshiba, Minato-ku, Tokyo (JP)

(72) Inventors: Tomohiro Hamada, Tachikawa (JP); Tetsuya Kugimiya, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 123 days.

(21) Appl. No.: 14/021,935

(22) Filed: Sep. 9, 2013

(65) Prior Publication Data

US 2014/0174780 A1 Jun. 26, 2014

Related U.S. Application Data

(63) Continuation of application No. PCT/JP2013/058365, filed on Mar. 22, 2013.

(30) Foreign Application Priority Data

Dec. 25, 2012 (JP) ................................. 2012-280908

(51) Int. Cl.
*H05K 5/00* (2006.01)
*H05K 7/00* (2006.01)
(Continued)

(52) U.S. Cl.
CPC ............ *G06F 1/1675* (2013.01); *G06F 1/1624* (2013.01)

(58) Field of Classification Search
CPC .... G06F 1/622; H04M 1/0237; H05K 1/0215
USPC ............... 361/679.01–679.09, 679.1–679.19, 361/679.31–679.45, 679.55–679.6, 361/724–747; 248/80–88, 155.1–155.5, 248/166–173, 180.1–186.2, 229.1–231.51, 248/271.4, 292.14, 316.1–316.8; 292/1–62, 292/113, 169.11–169.23, 341.11–341.19
See application file for complete search history.

(56) References Cited

U.S. PATENT DOCUMENTS

| 2007/0115255 A1* | 5/2007 | Pan ............................... 345/156 |
| 2010/0195296 A1* | 8/2010 | Nishiwaki ..................... 361/752 |
| 2011/0134592 A1 | 6/2011 | Mikami |

FOREIGN PATENT DOCUMENTS

| JP | 2-102778 U | 8/1990 |
| JP | 7-322020 | 12/1995 |

(Continued)

OTHER PUBLICATIONS

An English Translation of the International Search Report mailed by Japan Patent Office on Jul. 3, 2014 in the corresponding PCT application No. PCT/JP2013/058365 and Notification (PCT/IB/311)—3 pages.

(Continued)

*Primary Examiner* — Jerry Wu
(74) *Attorney, Agent, or Firm* — Knobbe, Martens, Olson & Bear, LLP

(57) ABSTRACT

According to one embodiment, an electronic apparatus includes a first wall, a second wall, a moving portion, a flexible cable, and a first contact portion. The moving portion is located between the first wall and the second wall. The cable comprises a curving portion between the first wall and the second wall, a first portion brought into contact with the first wall, and a second portion brought into contact with the second wall. The first contact portion is provided on the first wall and is in contact with the first portion of the cable. The cable can slide more smoothly on the first contact portion than on the second wall.

10 Claims, 9 Drawing Sheets

(51) Int. Cl.
*E04G 3/00* (2006.01)
*G06F 1/16* (2006.01)

(56) References Cited

FOREIGN PATENT DOCUMENTS

| JP | 10-315452 | 12/1998 |
| JP | 2003-198156 | 7/2003 |
| JP | 2006-115048 | 4/2006 |
| JP | 2006-331732 | 12/2006 |
| JP | 2009-188866 | 8/2009 |
| JP | 2011-119797 | 6/2011 |
| WO | WO 2010/021124 | 2/2010 |
| WO | WO 2014/103362 A1 | 7/2014 |

OTHER PUBLICATIONS

International Search Report and Written Opinion for application No. PCT/JP2013/058365, dated Apr. 23, 2013.

* cited by examiner

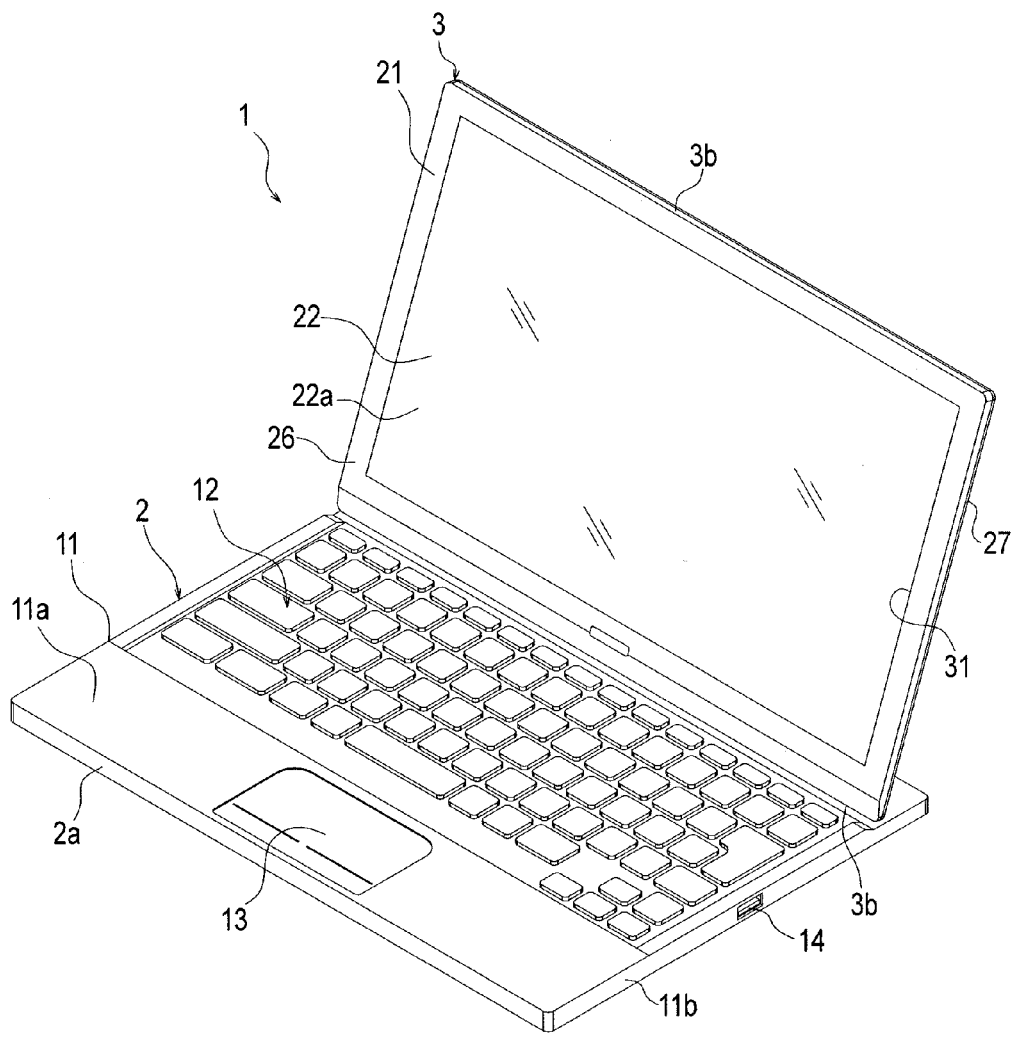
F I G. 1

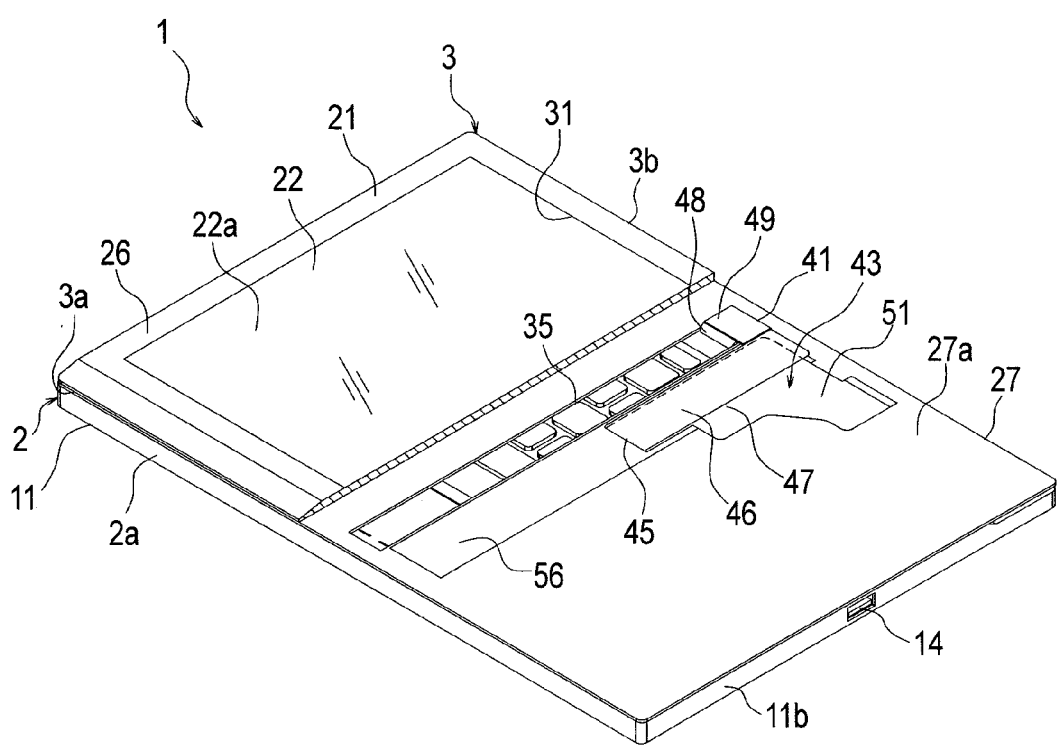
F I G. 4

ELECTRONIC APPARATUS

CROSS REFERENCE TO RELATED APPLICATIONS

This application is a Continuation Application of PCT Application No. PCT/JP2013/058365, filed Mar. 22, 2013 and based upon and claiming the benefit of priority from Japanese Patent Application No. 2012-280908, filed Dec. 25, 2012, the entire contents of all of which are incorporated herein by reference.

FIELD

Embodiments described herein relate generally to an electronic apparatus.

BACKGROUND

An electronic apparatus is deformable in a plurality of forms. For example, a portable computer deformable in a form of a tablet device is well known. The portable computer comprises, for example, a displaying unit comprising a display and a main body unit comprising an MPU and a storage. Since the portable computer is deformable in the form of the portable computer and the form of the tablet device, the displaying unit moves about the main body unit.

In an example of the above-described portable computer, the displaying unit and the main body unit are connected by, for example, a flexible harness. When the displaying unit moves about the main body unit, buckling occurs at the harness and the harness may be bent at an unintended position.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary perspective view showing a portable computer of a first embodiment;

FIG. 4 is an exemplary perspective view showing the portable computer of the first embodiment in which the displaying unit is located at a second position;

DETAILED DESCRIPTION

Figure 2:
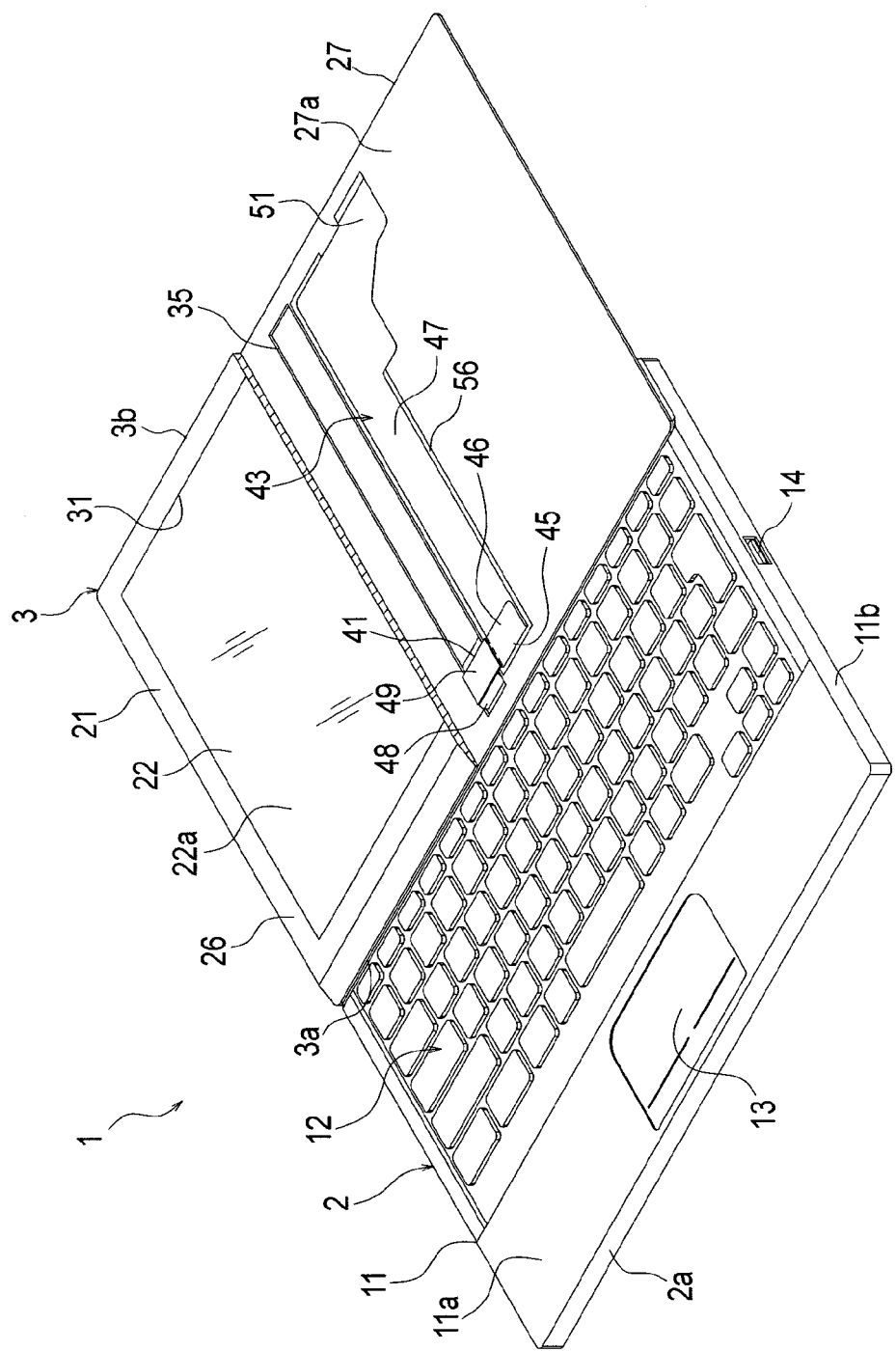
FIG. 2 is an exemplary perspective view showing the portable computer of the first embodiment in which a displaying unit is laid down.

Various embodiments will be described hereinafter with reference to the accompanying drawings. In general, according to one embodiment, an electronic apparatus comprises a first wall, a second wall, a moving portion, a flexible cable, and a first contact portion. The second wall faces the first wall. The moving portion is located between the first wall and the second wall, and can be moved along the first wall and the second wall. The cable comprises an arcuate curving portion between the first wall and the second wall, a first portion which is continuous from one of end portions of the curving portion, fixed on the moving portion, and brought into contact with the first wall, and a second portion which is continuous from the other end portion of the curving portion, fixed on the second wall, and brought into contact with the second wall. The cable is moved such that the first portion becomes longer and the second portion becomes shorter, or such that the first portion becomes shorter and the second portion becomes longer, due to the movement of the moving portion. The first contact portion is provided on the first wall and is in contact with the first portion of the cable. The cable can slide more smoothly on the first contact portion than on the second wall.

A first embodiment will be hereinafter described with reference to FIG. 1 to FIG. 6. In the present specification, a near side (i.e., a user side) is defined as "forward", a far side seen from the user is defined as "backward", a left side seen from the user is defined as "leftward", a right side seen from the user is defined as "rightward", an upper side seen from the user is defined as "upward", and a lower side seen from the user is defined as "downward". Some components are expressed by two or more terms. Those terms are just examples. Those components may be further expressed by another or other terms. And the other components which are not expressed by two or more terms may be expressed by another or other terms. Each of the drawings schematically shows the embodiment. Dimensions of each of the components shown in the drawings may be different from those in the description of the embodiment.

Figure 3:
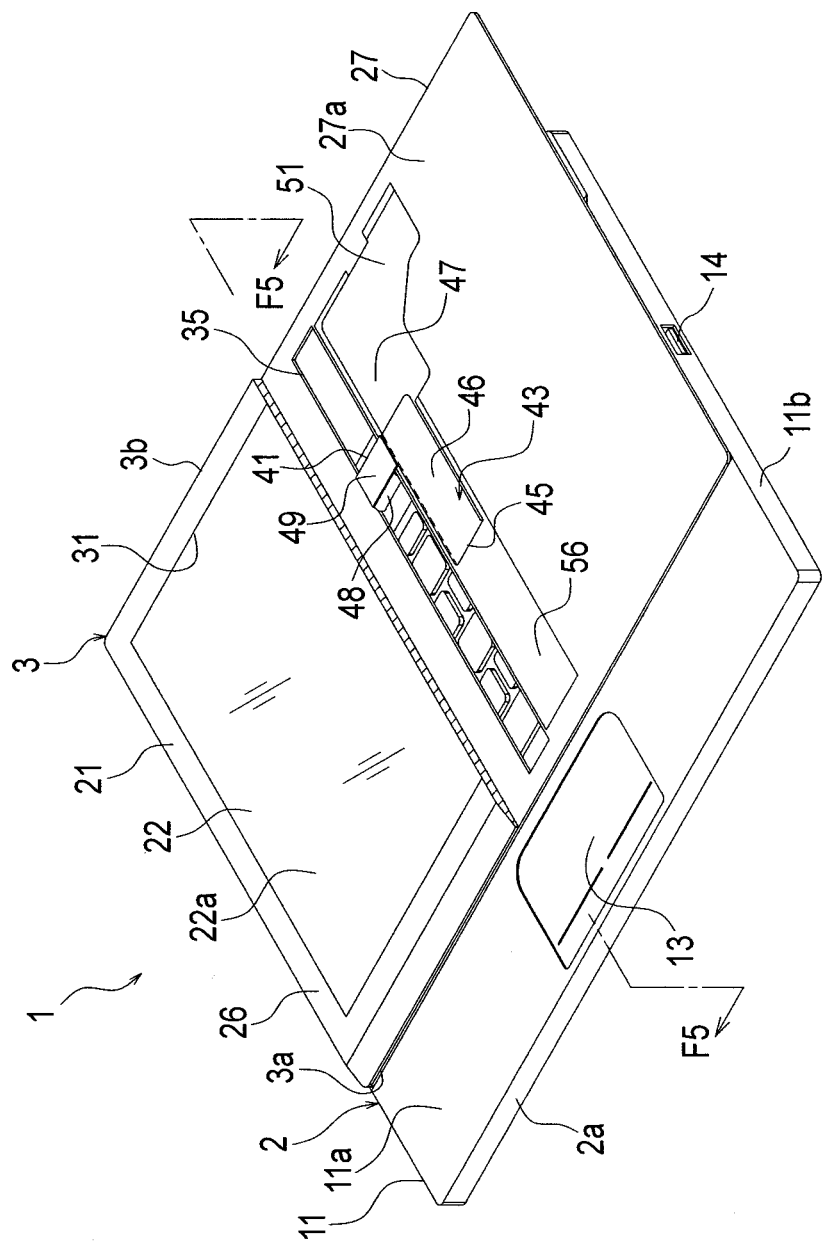
FIG. 3 is an exemplary perspective view showing the portable computer of the first embodiment in which the displaying unit has slid.

FIG. 1 is an exemplary perspective view showing a portable computer 1 having a displaying unit 3 located at a first position. FIG. 2 is an exemplary perspective and partially cutaway view showing the portable computer 1 in which the displaying unit 3 is laid down. FIG. 3 is an exemplary perspective and partially cutaway view showing the portable computer 1 in which the displaying unit 3 has slid. FIG. 4 is an exemplary perspective and partially cutaway view showing the portable computer 1 in which the displaying unit 3 is located at a second position.

The portable computer 1 is an example of an electronic apparatus. The electronic apparatus may not only be the portable computer 1, but also the other electronic apparatus such as a mobile phone, smartphone, tablet device or a portable game machine.

As shown in FIG. 1, the portable computer 1 comprises a main body unit 2 and the displaying unit 3. The main body unit 2 is also called a first portion, a base portion or a main unit. The displaying unit 3 is also called a second portion, a display device or a display unit.

The main body unit 2 comprises a base housing 11, a keyboard 12, a touch click pad 13, and a connector 14. The base housing 11 is also called a first housing. The base housing 11 is formed in a shape of a rectangular box. The base housing 11 contains a mother board on which, for example, a MPU and a storage are mounted and a battery.

The keyboard 12 and the touch click pad 13 are arranged on a top surface 11a of the base housing 11. The keyboard 12 is employed for, for example, inputting letters and characters, and operating the portable computer 1. The touch click pad 13 is employed for, for example, movement of a cursor and a click operation.

The connector 14 is mounted on the mother board and is exposed through, for example, an opening provided on a side surface 11b of the base housing 11. The connector 14 is, for example, a USB connector or HDMI connector.

The displaying unit 3 comprises a display housing 21 and a display module 22. The display module 22 is an example of a first wall and is also called a first member or a first component. The display housing 21 is also called a second housing, an enclosing portion, a wall portion or a container portion.

The display housing 21 is formed in a shape of a rectangular box. The display housing 21 comprises a front cover 26 and a rear cover 27 as shown in FIG. 2. The rear cover 27 is an example of a second wall and is also called a second member or a second component. The front cover 26 and the rear cover 27 are also called outer walls, wall portions or covering portions.

The front cover 26 is formed of, for example, a magnesium alloy. The rear cover 27 is formed of, for example, a synthetic resin. The materials of the front cover 26 and the rear cover 27 are not limited to these.

The front cover 26 forms a front surface and a side surface of the display housing 21. The rear cover 27 forms a back surface of the display housing 21. The front cover 26 is formed on the rear cover 27 by, for example, a screw or a lug to form the display housing 21.

A display opening 31 is provided on the front cover 26. The display opening 31 is formed in an approximately rectangular shape and is covered with, for example, a transparent glass panel 31a (shown in FIG. 5).

The display module 22 is housed in the display housing 21. The display module 22 comprises a screen 22a on which an image is displayed. The screen 22a is exposed by the display opening 31. The screen 22a is covered with the panel 31a.

The display module 22 is, for example, a liquid crystal display. The display module 22 comprises a touch panel. The user operates the portable computer 1 by touching the panel 31a on the screen 22a with a finger or a stylus pen.

The displaying unit 3 is connected to a rear end portion of the main body unit 2 by a slide hinge. The displaying unit 3 can be moved between a first position shown in FIG. 1 and a second position shown in FIG. 4 by the slide hinge. The displaying unit 3 at the first position stands obliquely from the rear end portion of the main body unit 2.

To cause the displaying unit 3 to move from the first position to the second position, the obliquely standing displaying unit 3 is first laid down. The laid displaying unit 3 is arranged approximately parallel to the main body unit 2 as shown in FIG. 2. Then, the displaying unit 3 is caused to slide to the main body unit 2. The displaying unit 3 slides such that a lower end 3a of the displaying unit 3 becomes close to a front end 2a of the main body unit 2 as shown in FIG. 3. When the displaying unit 3 reaches the second position, the lower end 3a of the displaying unit 3 and the front end 2a of the main body unit 2 align to form a same plane.

The displaying unit 3 arranged at the second position covers the top surface 11a of the base housing 11 as shown in FIG. 4. Foe this reason, the keyboard 12 and the touch click pad 13 are covered with the displaying unit 3.

When the displaying unit 3 is arranged at the second position, the user operates the portable computer 1 by the display module 22 comprising the touch panel. In other words, portable computer 1 comprising the displaying unit 3 at the second position is employed as the tablet device.

Figure 5:
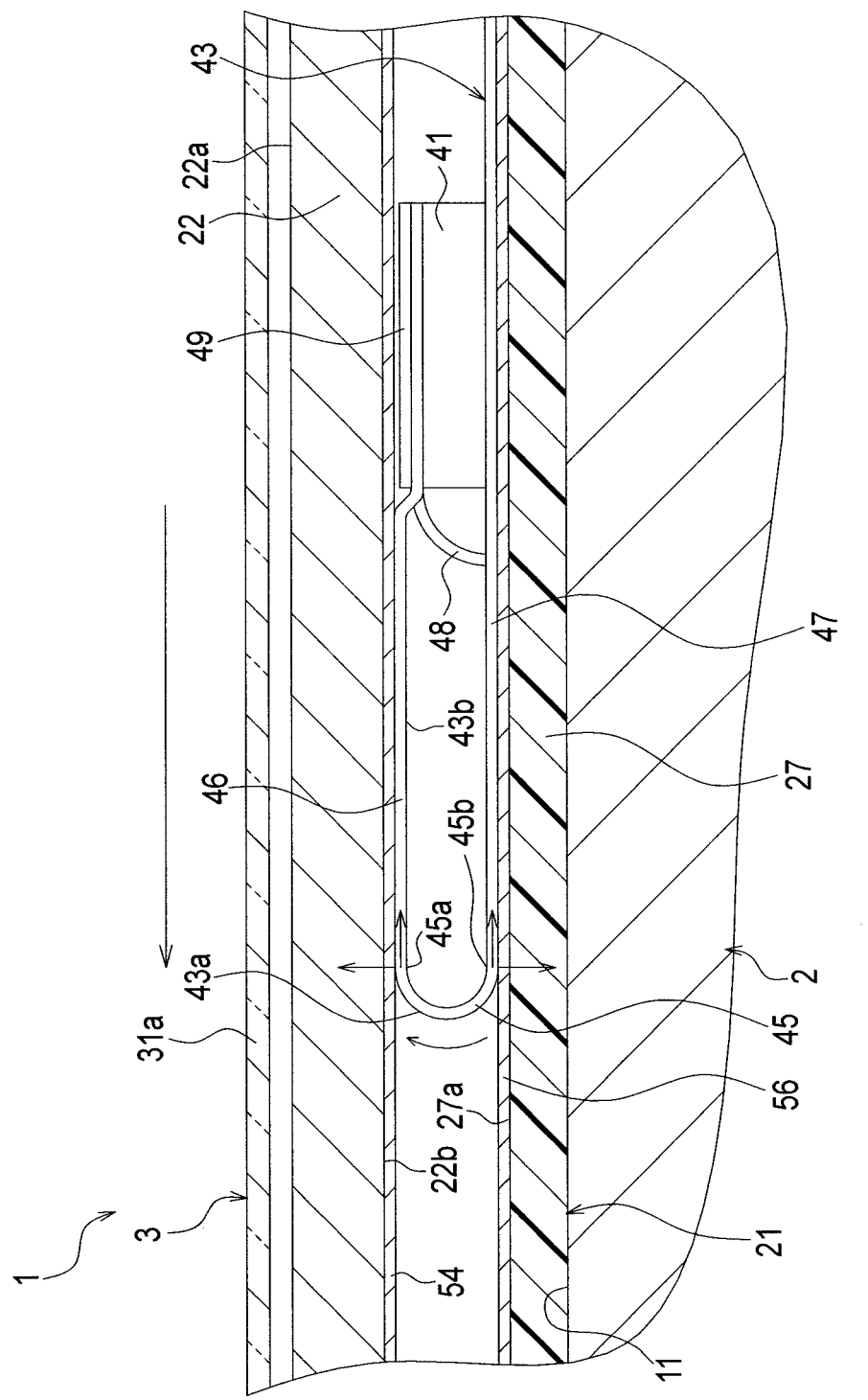
FIG. 5 is an exemplary cross-sectional view showing the portable computer of the first embodiment as seen along a line F5-F5 in FIG. 3.

FIG. 5 is an exemplary cross-sectional view showing a portion of the portable computer 1 as seen along a line F5-F5 in FIG. 3. As shown in FIG. 5, the display module 22 has a rear surface 22b opposite to the rear cover 27. The rear surface 22b is an example of a first surface. The rear surface 22b is at the opposite side to the screen 22a and is formed of, for example, aluminum. The material of the rear surface 22b is not limited to this. The rear cover 27 has an inner surface 27a opposite to the display module 22. The inner surface 27a is an example of a second surface.

Each of the rear surface 22b of the display module 22 and the inner surface 27a of the rear cover 27 is formed to be plane. If the rear surface 22b of the display module 22 and the inner surface 27a of the rear cover 27 face each other, one of them may be inclined to the other. A distance between the rear surface 22b of the display module 22 and the inner surface 27a of the rear cover 27 is, for example, about 2 mm.

As shown in FIG. 2, an opening portion 35 is provided at the rear cover 27. The opening portion 35 is located at a central portion in the longitudinal direction of the rectangular rear cover 27. The opening portion 35 is a rectangular hole, which is provided from a portion close to the lower end 3a of the displaying unit 3 to a portion close to an upper end 3b of the displaying unit 3.

The portable computer 1 further comprises a moving portion 41 and a flexible printed wiring board (hereinafter called FPC) 43. The FPC 43 is an example of a flexible cable and is also called a harness, a cable, a connecting portion or a connecting component.

The moving portion 41 is attached to a rear end portion of the top surface 11a of the base housing 11. The moving portion 41 is engaged with an edge of the opening portion 35 so as to be movable. As shown in FIG. 5, a part of the moving portion 41 is located between the display module 22 and the rear cover 27.

As shown in FIG. 1 to FIG. 4, when the displaying unit 3 is moved to the main body unit 2, the moving portion 41 is moved to the displaying unit 3 together with the main body unit 2. The moving portion 41 is moved along the opening portion 35. In other words, the moving portion 41 is movable along the display module 22 and the rear cover 27.

As shown in FIG. 5, the FPC 43 has a curving portion 45, a first portion 46, a second portion 47 and a connecting portion 48. The curving portion 45 is also called a bent portion, a middle portion, or a turning portion. As shown in FIG. 3, the FPC 43 is formed in a shape of a belt extending along a shorter side of the rear cover 27 and is folded at the curving portion 45. The FPC 43 has a thickness of, for example, about 0.1 mm. As shown in FIG. 5, the curving portion 45, the first portion 46 and the second portion 47 are arranged between the display module 22 and the rear cover 27.

The curving portion 45 is a part of the arcuately curved FPC 43. The FPC 43 causes an elastic force to be generated at the curving portion 45. The curving portion 45 is positioned between the first portion 46 and the second portion 47.

The first portion 46 is continuous from a first end portion 45a of the curving portion 45 and extends along the rear surface 22b of the display module 22. An end portion of the first portion 46 is fixed at the moving portion 41. A reinforcing plate 49 is attached to the end portion of the first portion 46. The reinforcing plate 49 is a member having a higher rigidity than the FPC 43. The end portion of the first portion 46 is sandwiched between the reinforcing plate 49 and the moving portion 41.

The second portion 47 is continuous from a second end portion 45b of the curving portion 45 and extends along the inner surface 27a of the rear cover 27. As shown in FIG. 2, a terminal portion 51 is provided at an end portion of the second portion 47. The terminal portion 51 is connected to the display module 22. The terminal portion 51 of the second portion 47 is fixed on the inner surface 27a of the rear cover 27.

The connecting portion 48 extends continuously from an end portion of the first portion 46 fixed at the moving portion 41. The connecting portion 48 enters an interior of the main body unit 2 through the opening portion 35. The connecting portion 48 is connected to, for example, the mother board of the main body unit 2, inside the main body unit 2. For this reason, the main body unit 2 is electrically connected with the display module 22 via the FPC 43.

As shown in FIG. 5, a first contact portion 54 is provided on the rear surface 22b of the display module 22. The first contact portion 54 is also called a first slide portion or a first friction portion.

The first contact portion 54 is a Teflon (registered trademark) sheet applied onto the rear surface 22b of the display module 22. The Teflon (registered trademark) sheet is an example of a first sheet. The Teflon (registered trademark) sheet has a thickness of, for example, about 0.1 mm.

A coefficient of friction (coefficient of kinetic friction) of the Teflon (registered trademark) sheet forming the first contact portion 54 is smaller than a coefficient of friction of a synthetic resin forming the rear cover 27 and is, for example, about 0.1. In other words, the first contact portion 54 slides more smoothly than the rear cover 27.

Furthermore, the coefficient of friction of the Teflon (registered trademark) sheet forming the first contact portion 54 is smaller than a coefficient of friction of aluminum forming the rear surface 22b of the display module 22. In other words, the first contact portion 54 slides more smoothly than the other portion of the display module 22.

The first contact portion 54 is not limited to the Teflon (registered trademark) sheet. The first contact portion 54 may also be, for example, a lubricant applied onto the rear surface 22b of the display module 22. In addition, the first contact portion 54 may also be a part of the rear surface 22b polished more than the other portion or processed in a shape of a rail extending along the first portion 46. In other words, the first contact portion 54 may be formed by processing a surface of a part of the rear surface 22b to decrease the coefficient of friction.

The first end portion 45a of the curving portion 45 of the FPC 43 and at least a part of the first portion 46 are brought into contact with the first contact portion 54. The first end portion 45a of the curving portion 45 presses the first contact portion 54 by an elastic pressure.

The FPC 43 has a first surface 43a and a second surface 43b. The first surface 43a is also called an outer surface or a front surface. The second surface 43b is also called an inner surface or a rear surface. The first surface 43a is a surface which is in contact with the first contact portion 54. The second surface 43b is located at an opposite side to the first surface 43a.

A second contact portion 56 is provided on the inner surface 27a of the rear cover 27. The second contact portion 56 is also called a second slide portion or a second friction portion. The second contact portion 56 faces the first contact portion 54.

The second contact portion 56 is an anti-slip sheet applied onto the inner surface 27a of the rear cover 27. The anti-slip sheet is an example of a second sheet and is formed of, for example, a synthetic rubber. The anti-slip sheet has a thickness of, for example, about 0.1 mm.

A coefficient of friction of the anti-slip sheet forming the second contact portion 56 is greater than the coefficient of friction of the synthetic resin forming the rear cover 27 and is, for example, about 0.4. In other words, the second contact portion 56 slides less smoothly than the other portion of the rear cover 27.

The second contact portion 56 is not limited to the anti-slip sheet. The second contact portion 56 may also be, for example, a double-faced tape having a high removability. Furthermore, the second contact portion 56 may also be, for example, a part of the inner surface 27a which is processed more roughly than the other portion and is subjected to surface texturing. In other words, the second contact portion 56 may be formed by processing a surface of a part of the inner surface 27a to increase the coefficient of friction.

The second end portion 45b of the curving portion 45 of the FPC 43 and at least a part of the second portion 47 are brought into contact with the second contact portion 56. The surface of the FPC 43 in contact with the second contact portion 56 is the first surface 43a. The second end portion 45b of the curving portion 45 presses the second contact portion 56 by the elastic pressure.

The FPC 43 in a case where the displaying unit 3 is moved from the first position to the second position will be hereinafter described. When the displaying unit 3 is at the first position as shown in FIG. 2, the moving portion 41 is positioned in vicinity of one of end portions of the opening portion 35. At this time, the first portion 46 of the FPC 43 is remarkably shorter than the second portion 47.

When the displaying unit 3 slides to the main body unit 2 as shown in FIG. 3, the display module 22 and the rear cover 27 are moved to the moving portion 41 attached to the main body unit 2. In other words, the moving portion 41 is moved relatively to the display module 22 and the rear cover 27.

When the displaying unit 3 is moved from the first position to the second position as shown in FIG. 5, the moving portion 41 is moved so as to go away from the curving portion 45. At this time, the curving portion 45 is moved (turned) from the second portion 47 to the first portion 46. For this reason, the first portion 46 becomes longer and the second portion 47 becomes shorter as the moving portion 41 is moved.

The second end portion 45b of the curving portion 45 presses the second contact portion 56. For this reason, a frictional force is caused between a portion of contact between the second end portion 45b of the curving portion 45 and the second portion 47, and the second contact portion 56. In contrast, since the terminal portion 51 is moved together with the rear cover 27, the terminal portion 51 pushes the second portion 47 in the direction of movement of the rear cover 27 (leftward in FIG. 5).

For simple description, it is assumed that the portable computer 1 does not comprise the second contact portion 56. In this case, the second end portion 45b of the curving portion 45 and the second portion 47, of the FPC 43, are brought into direct contact with the inner surface 27a of the rear cover 27. Since the second contact portion 56 having a high coefficient of friction is not present on the inner surface 27a, slip may occur at the portion of contact between the second end portion 45b of the curving portion 45 and the second portion 47, and the inner surface 27a. In other words, the second end portion 45b of the curving portion 45 and the second portion 47 may float from the inner surface 27a.

If the slip occurs, the movement of the curving portion 45 is stopped while the terminal portion 51 continues pushing the second portion 47. For this reason, buckling may occur at the second portion 47. If the buckling occurs at the second portion 47, the FPC 43 may be bent at an unintended position.

In contrast, in the portable computer 1 of the present embodiment comprising the second contact portion 56, a great frictional force occurs at the portion of contact between the second end portion 45b of the curving portion 45 and the second portion 47, and the second contact portion 56. For this reason, occurrence of the above-described slip at the portion of contact between the second end portion 45b of the curving portion 45 and the second portion 47, and the second contact portion 56 is restricted.

Since the great frictional force occurs, the second contact portion 56 feeds the second portion 47 toward the curving portion 45. The curving portion 45 is therefore moved smoothly from the second portion 47 toward the first portion 46.

When the displaying unit 3 reaches the second position as shown in FIG. 4, the length of the first portion 46 becomes substantially the same as the length of the second portion 47. At this time, the moving portion 41 is positioned in the vicinity of the other end portion of the opening portion 35.

Figure 6:
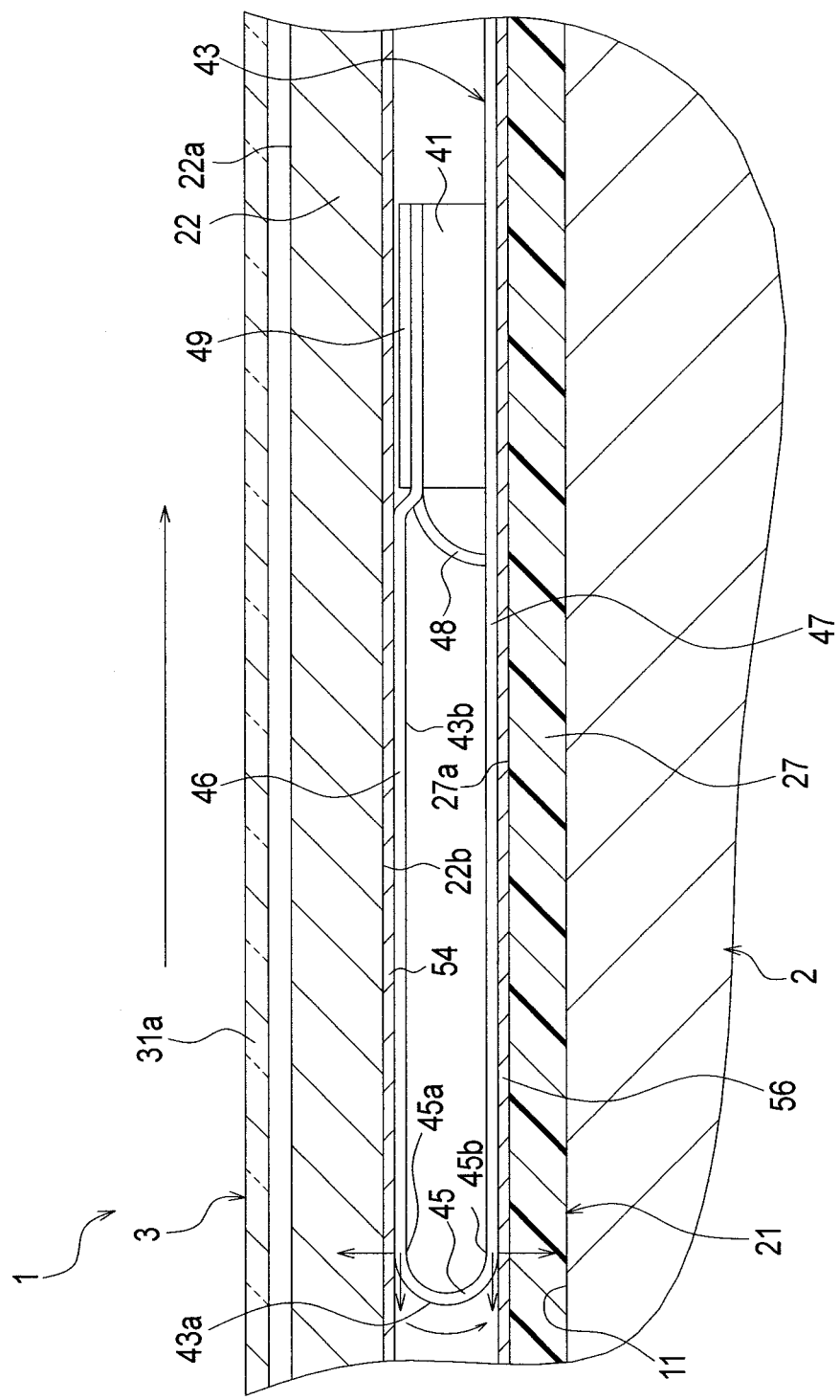
FIG. 6 is an exemplary cross-sectional view showing the portable computer of the first embodiment in which the displaying unit is moved.

Next, the FPC 43 in a case where the displaying unit 3 is moved from the second position to the first position will be described. FIG. 6 is an exemplary cross-sectional view showing a part of the portable computer 1 in a case where the displaying unit 3 is moved toward the first position.

When the displaying unit 3 is moved from the second position to the first position as shown in FIG. 6, the moving portion 41 is moved to approach the curving portion 45. At this time, the curving portion 45 is moved (rotated) from the first portion 46 toward the second portion 47. For this reason, since the moving portion 41 is moved, the first portion 46 becomes shorter and the second portion 47 becomes longer.

The first end portion 45a of the curving portion 45 presses the first contact portion 54. For this reason, the frictional force occurs at the portion of contact between the first end portion 45a of the curving portion 45 and the first portion 46, and the first contact portion 54. In contrast, since the terminal portion 51 is moved together with the rear cover 27, the terminal portion 51 pulls the second portion 47 in the direction of movement of the rear cover 27 (rightward in FIG. 6).

For simple description, it is assumed that the portable computer 1 does not comprise the first contact portion 54. In this case, the first end portion 45a of the curving portion 45 and the first portion 46, of the FPC 43, are brought into direct contact with the rear surface 22b of the display module 22. Since the first contact portion 54 having a small frictional force is not present on the rear surface 22b, the first end portion 45a of the curving portion 45 and the first portion 46 may be snagged on the rear surface 22b.

In other words, the rear surface 22b may stop the movement of the curving portion 45 and the first portion 46.

If the snag occurs, the movement of the curving portion 45 is stopped while the moving portion 41 pushes the first portion 46. For this reason, buckling may occur at the first portion 46. If the buckling occurs at the first portion 46, the FPC 43 may be bent at an unintended position.

In contrast, in the portable computer 1 of the present embodiment comprising the first contact portion 54, the frictional force at the portion of contact between the first end portion 45a of the curving portion 45 and the first portion 46, and the first contact portion 54, is small. For this reason, occurrence of the snag at the portion of contact between the first end portion 45a of the curving portion 45 and the first portion 46, and the first contact portion 54 is restricted.

The terminal portion 51 pulls the second portion 47 and the first portion 46 slides on the first contact portion 54. The curving portion 45 is therefore moved smoothly from the first portion 46 toward the second portion 47.

According to the portable computer 1 of the first embodiment, the first contact portion 54 slides more easily than the rear cover 27. When the moving portion 41 is moved to approach the curving portion 45, occurrence of the above-described snag at the first portion 46 can be restricted since the first portion 46 of the FPC 43 slides smoothly on the first contact portion 54. In addition, when the moving portion 41 is moved to go away from the curving portion 45, occurrence of the above-described slip at the second portion 47 can be restricted since the second portion 47 of the FPC 43 hardly slides on the rear cover 27. Therefore, bending of the FPC 43 can be restricted and endurance and reliability of the FPC 43 can be improved.

The above-described slip and snag occur more easily as a gap between the display module 22 and the rear cover 27 is smaller. However, since the slip and snag are restricted by the first contact portion 54, the portable computer 1 can be thinner.

In addition, the above-described slip and snag occur more easily as a distance of movement (stroke) of the displaying unit 3 to the main body unit 2 is longer. However, since the slip and snag are restricted by the first contact portion 54, the displaying unit 3 can be moved to the main body unit 2 in a long distance.

The portable computer 1 comprises the second contact portion 56 which slides less easily than the other portion of the rear cover 27. The second portion 47 of the FPC 43 can thereby hardly slide when the moving portion 41 is moved to go away from the curving portion 45. The above-described slip can be therefore more restricted.

The first contact portion 54 is, for example, the Teflon (registered trademark) sheet having a smaller coefficient of friction than the display module 22. Since the first contact portion 54 is formed by applying such a sheet onto the rear surface 22b of the display module 22, the portable computer 1 can be easily produced.

The second contact portion 56 is, for example, the anti-slip sheet having a higher coefficient of friction than the rear cover 27. Since the second contact portion 56 is formed by applying such a sheet onto the inner surface 27a of the rear cover 27, the portable computer 1 can be easily produced.

The first contact portion 54 and the second contact portion 56 may be formed by the surface processing as described above. In this case, increase in the thickness and material cost of the portable computer 1 can be restricted.

Next, a second embodiment will be described with reference to FIG. 7. In at least one of the embodiments described below, components having the same functions as the portable computer 1 of the first embodiment are denoted by the same reference numerals. Furthermore, a part or all of descriptions of the components can be omitted.

Figure 7:
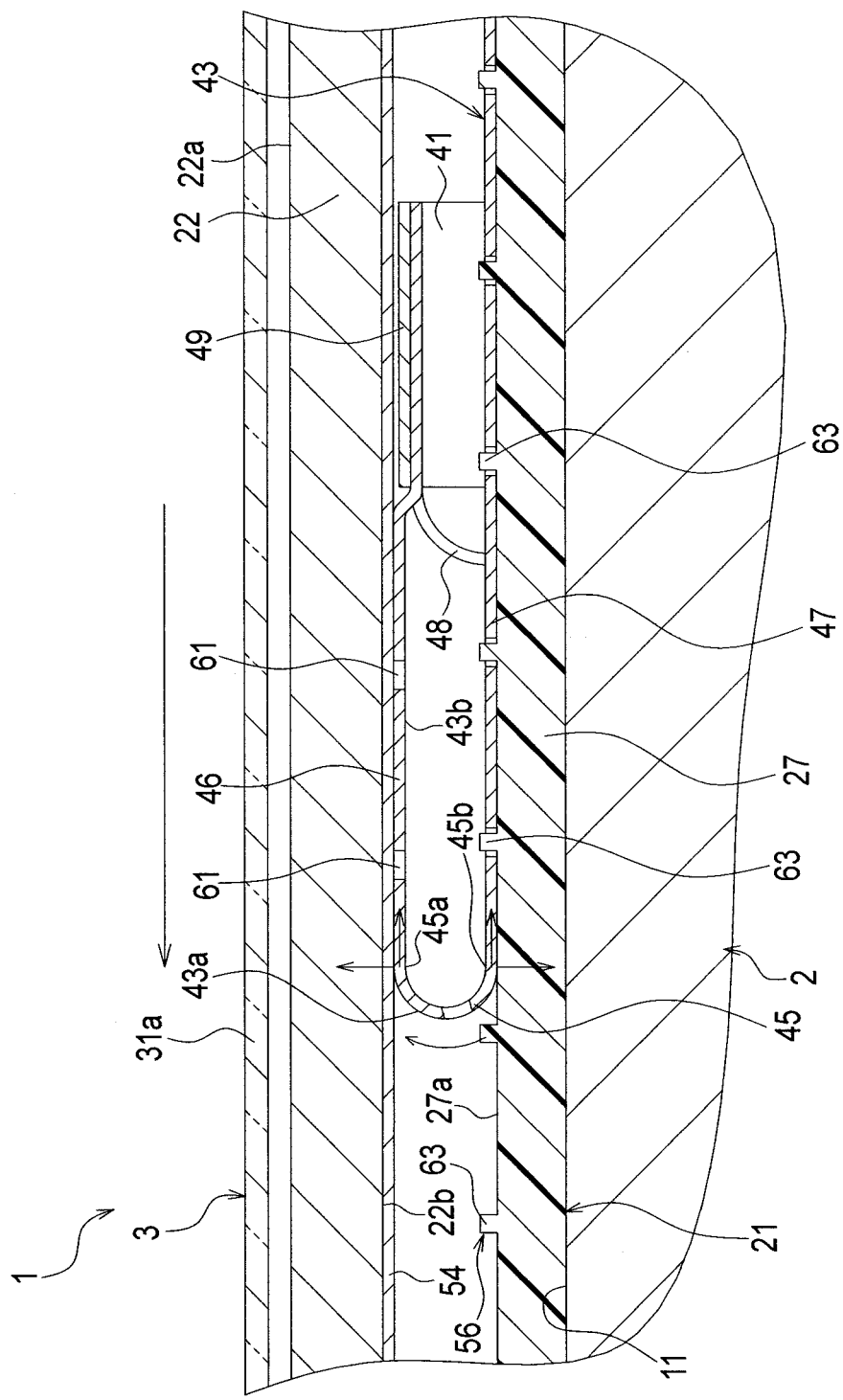
FIG. 7 is an exemplary cross-sectional view showing a portable computer of a second embodiment.

FIG. 7 is an exemplary cross-sectional view showing a portable computer 1 of a second embodiment. As shown in FIG. 7, a FPC 43 comprises a plurality of apertures 61. The plurality of apertures 61 are examples of a plurality of first fitting portions.

The plurality of apertures 61, each formed in a circular shape, are provided at a curving portion 45, a first portion 46 and a second portion 47 of the FPC 43. The plurality of apertures 61 are aligned in a row along a short-side direction of a displaying unit 3. In other words, the plurality of apertures 61 are aligned along the direction in which the FPC 43 is moved. The plurality of apertures 61 are aligned and spaced apart with constant intervals. The first fitting portions are not limited to the circular apertures 61, but may also be, for example, cutaway portions formed at an edge of the FPC 43.

A second contact portion 56 comprises a plurality of projections 63. The plurality of projections 63 are examples of a plurality of second fitting portions. The projections 63 are columns each projecting from an inner surface 27a of a rear cover 27. The shape of the projections 63 is not limited to this. An outer diameter of the projections 63 is smaller than an inner diameter of the apertures 61. A height of the projections 63 is slightly greater than a thickness of the FPC 43.

The plurality of projections 63 are arranged to correspond to the plurality of apertures 61. For this reason, the plurality of projections 63 are arranged in a row in a short-side direction of the displaying unit 3. In other words, the plurality of projections 63 are aligned along the direction in which the FPC 43 is moved.

The plurality of projections 63 are inserted into the plurality of apertures 61 provided at the second portion 47 of the FPC 43. In other words, the projections 63 are fitted in the apertures 61 of the second portion 47. For this reason, the plurality of projections 63 restrict the movement of the second portion 47 on the inner surface 27a of the rear cover 27.

When the displaying unit 3 is moved from a first position toward a second position, the projections 63 fitted in the apertures 61 push the second portion 47 in the direction of movement of the rear cover 27 (leftward in FIG. 7). For this reason, occurrence of slip at a portion of contact between a second end portion 45b of the curving portion 45 and the second portion 47, and the inner surface 27a of the rear cover 27 is restricted.

In addition, the projections 63 feed the second portion 47 toward the curving portion 45 when the projections 63 are fitted in the apertures 61. For this reason, the curving portion 45 is smoothly moved from the second portion 47 toward the first portion 46.

According to the portable computer 1 of the second embodiment, the plurality of projections 63 are fitted in the plurality of apertures 61 provided on the FPC 43. The above-described slip is thereby restricted and bending of the FPC 43 can be thereby restricted. Furthermore, the projections 63 are physically fitted in the apertures 61. For this reason, for example, even if a coefficient of friction of a material of the projections 63 is varied, the above-described slip can be restricted stably.

The first and second fitting portions are not limited to the apertures 61 and the projections 63. For example, projections may be provided on the FPC 43 as the first fitting portions and recess portions may be provided on the inner surface 27a of the rear cover 27 as the second fitting portions. In addition, a cover attached to the inner surface 27a to cover a part of the second portion 47 of the FPC 43 may be provided and the projections 63 may be provided at the cover.

Next, a third embodiment will be described with reference to FIG. 8 and FIG. 9.

Figure 8:
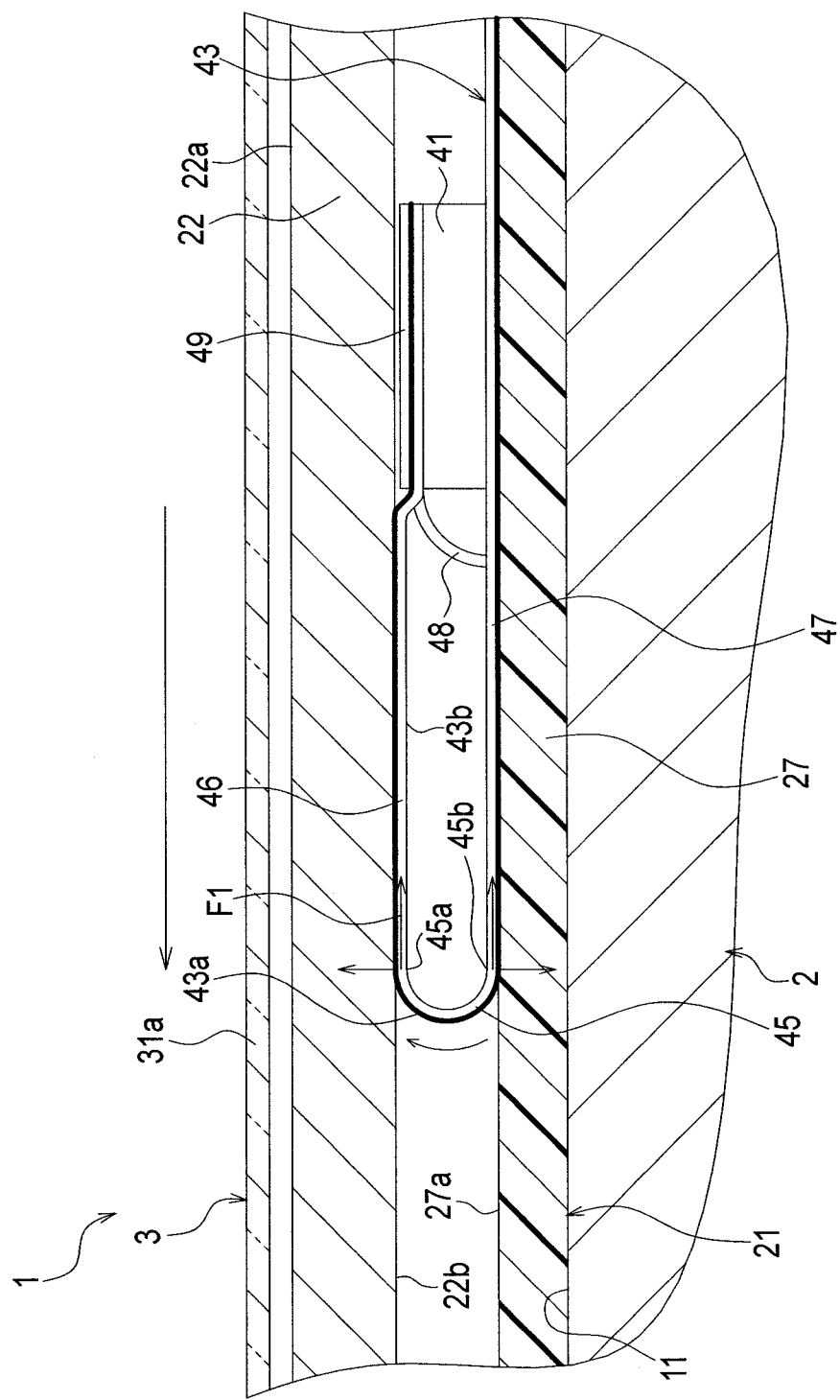
FIG. 8 is an exemplary cross-sectional view showing a portable computer of a third embodiment.

FIG. 8 is an exemplary cross-sectional view showing a portable computer 1 of a third embodiment. As shown in FIG. 8, a first surface 43a of a FPC 43 is in contact with a rear surface 22b of a display module 22 and with an inner surface 27a of a rear cover 27. The first surface 43a is an example of a friction-varied surface.

Figure 9:
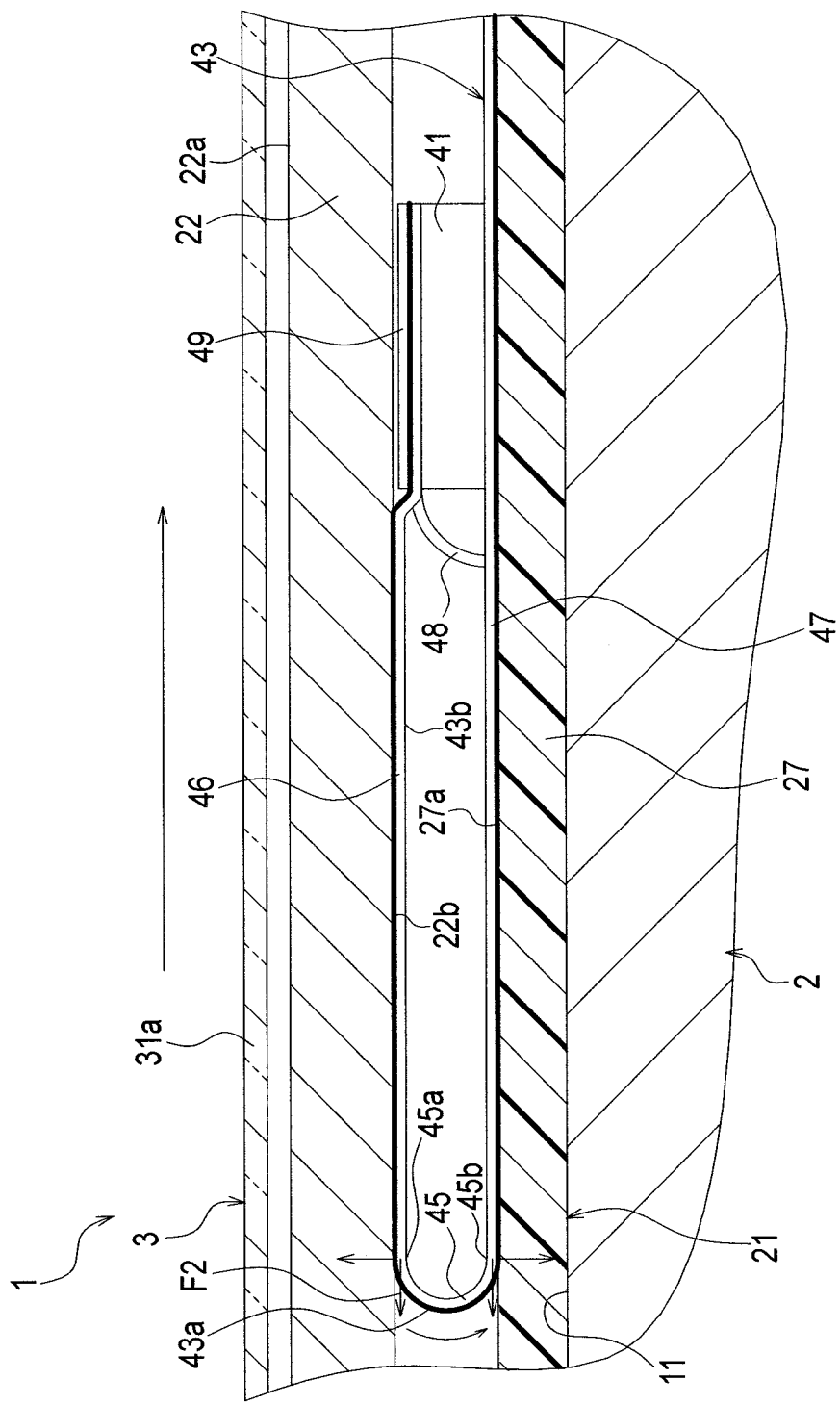
FIG. 9 is an exemplary cross-sectional view showing the portable computer of the third embodiment in which a displaying unit is moved.

A texture having a directional property in friction is formed on the first surface 43a of the FPC 43, as presented by a thick line in FIG. 8 and FIG. 9. For example, a number of sawtooth-shaped projections having a friction which becomes smaller in a direction and which becomes greater in an opposite direction are formed at the first surface 43a. The above-described texture is not limited to a texture directly provided on the first surface 43a of the FPC 43. For example, a sheet on which the above-described texture is provided may be applied onto the first surface 43a.

As shown in FIG. 8, when a displaying unit 3 slides toward a second position relative to a main body unit 2, a first portion 46 of the FPC 43 becomes longer and a second portion 47 becomes shorter. At this time, the first surface 43a of the FPC 43 which is in contact with the rear surface 22b of the display module 22 causes a first frictional force F1 to be generated. The first surface 43a which is in contact with the inner surface 27a of the rear cover 27 also causes a frictional force to be generated.

FIG. 9 is an exemplary cross-sectional view showing the portable computer 1 in which the displaying unit 3 is moved toward a first position.

As shown in FIG. 9, when the displaying unit 3 slides toward the first position relative to the main body unit 2, the first portion 46 of the FPC 43 becomes shorter and the second portion 47 becomes longer. At this time, the first surface 43a of the FPC 43 which is in contact with the rear surface 22b of the display module 22 causes a second frictional force F2 to be generated. The first surface 43a which is in contact with the inner surface 27a of the rear cover 27 also causes a frictional force to be generated.

Since the above-described texture is provided on the first surface 43a of the FPC 43, the second frictional force F2 is smaller than the first frictional force F1. In other words, when a moving portion 41 is moved such that the first portion 46 of the FPC 43 becomes longer and the second portion 47 becomes shorter, the first surface 43a causes the greater first frictional force F1 to be generated. Oppositely, when the moving portion 41 is moved such that the first portion 46 of the FPC 43 becomes shorter and the second portion 47 becomes longer, the first surface 43a causes the smaller second frictional force F2 to be generated.

According to the portable computer 1 of the third embodiment, a texture having a directional property in friction is formed on the first surface 43a of the FPC 43. Thus, when the moving portion 41 is moved to approach a curving portion 45, occurrence of bending of the FPC 43 can be restricted since the first portion 46 of the FPC 43 slides smoothly on the rear surface 22b of the display module 22. In addition, when the moving portion 41 is moved to go away from the curving portion 45, occurrence of the bending of the FPC 43 can be restricted since the second portion 47 of the FPC 43 hardly slides on the inner surface 27a of the rear cover 27. In other words, the occurrence of bending of the FPC 43 can be restricted by adjusting the smoothness in sliding of the FPC 43, without adjusting the smoothness in sliding of the display module 22 or the rear cover 27.

According to at least one of the above-described electronic apparatuses, the occurrence of bending of the cable at the movement of the moving portion can be restricted by adjusting the smoothness in sliding of the cable or the portion which is in contact with the cable.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the first contact portion 54 alone may be provided and the second contact portion 56 may not be provided. Oppositely, the second contact portion 56 alone may be provided and the first contact portion 54 may not be provided. In these cases, the first surface 43a of the FPC 43 may be subjected to processing to increase or decrease the coefficient of friction. For example, if the first contact portion 54 alone is provided, an anti-slip sheet having a high coefficient of friction may be applied onto the first surface 43a of the FPC 43.

Thus, the frictional force is increased at the portion of contact between the FPC 43 and the rear cover 27, and the slip is restricted. Oppositely, if the second contact portion 56 alone is provided, a Teflon (registered trademark) sheet having a small coefficient of friction may be applied onto the first surface 43*a* of the FPC 43. Thus, the frictional force is decreased at the portion of contact between the FPC 43 and the display module 22, and the snag is restricted. The bending of the FPC 43 can be therefore restricted.

In addition, the second contact portion 56 may be, for example, a member such as a hook-and-loop fastener or a magnet, which can be combined with the FPC 43. Since the FPC 43 hardly slides at the second contact portion 56, slip can be restricted. The bending of the FPC 43 can be therefore restricted.

In addition, the first contact portion 54 may be provided on the entire region of the rear surface 22*b* of the display module 22. Similarly, the second contact portion 56 may be provided on the entire region of the inner surface 27*a* of the rear cover 27.

What is claimed is:

1. An electronic apparatus comprising:
   a first wall;
   a second wall facing the first wall;
   a moving portion between the first wall and the second wall, configured to move along the first wall and the second wall;
   a flexible cable comprising an arcuate curving portion between the first wall and the second wall, a first portion which is continuous from one of end portions of the arcuate curving portion, fixed on the moving portion, and brought into contact with the first wall, and a second portion which is continuous from the other end portion of the arcuate curving portion, fixed on the second wall, and brought into contact with the second wall, the flexible cable being moved such that the first portion becomes longer and the second portion becomes shorter, or such that the first portion becomes shorter and the second portion becomes longer, due to the movement of the moving portion; and
   a first contact portion on the first wall and in contact with the first portion of the flexible cable, on which the flexible cable slides more smoothly than on the second wall.

2. The apparatus of claim 1, wherein the flexible cable slides more smoothly on the first contact portion than on the other portion of the first wall.

3. The apparatus of claim 1, further comprising a second contact portion on the second wall and in contact with the second portion of the flexible cable, on which the flexible cable slides less smoothly than on the other portion of the second wall.

4. The apparatus of claim 3, wherein
   the first wall comprises a first surface facing the second wall; and
   the first contact portion comprises a first sheet which is provided on the first surface and which has a smaller coefficient of friction than the first wall.

5. The apparatus of claim 3, wherein
   the second wall comprises a second surface facing the first wall; and
   the second contact portion comprises a second sheet which is provided on the second surface and which has a greater coefficient of friction than the second wall.

6. The apparatus of claim 3, wherein
   the flexible cable comprises a plurality of first fitting portions aligned along a direction in which the flexible cable is moved; and
   the second contact portion comprises a plurality of second fitting portions which are provided on the second wall and which are capable of being fitted in the plurality of first fitting portions.

7. The apparatus of claim 3, wherein
   the first wall comprises a first surface facing the second wall; and
   the first contact portion is formed by subjecting a part of the first surface to surface processing and has a smaller coefficient of friction than the other portion of the first wall.

8. The apparatus of claim 3, wherein
   the second wall comprises a second surface facing the first wall; and
   the second contact portion is formed by subjecting a part of the second surface to surface processing and has a greater coefficient of friction than the other portion of the second wall.

9. An electronic apparatus comprising:
   a first wall;
   a second wall facing the first wall;
   a moving portion between the first wall and the second wall, configured to move along the first wall and the second wall;
   a flexible cable comprising an arcuate curving portion between the first wall and the second wall, a first portion which is continuous from one of end portions of the arcuate curving portion, fixed on the moving portion, and brought into contact with the first wall, and a second portion which is continuous from the other end portion of the arcuate curving portion, fixed on the second wall, and brought into contact with the second wall, the flexible cable being moved such that the first portion becomes longer and the second portion becomes shorter, or such that the first portion becomes shorter and the second portion becomes longer, due to the movement of the moving portion; and
   a first contact portion on the first wall and in contact with the first portion of the flexible cable, on which the arcuate cable slides more smoothly than on the other portion of the first wall.

10. An electronic apparatus comprising:
    a first wall;
    a second wall facing the first wall;
    a moving portion between the first wall and the second wall, configured to move along the first wall and the second wall;
    a flexible cable comprising an arcuate curving portion between the first wall and the second wall, a first portion which is continuous from one of end portions of the arcuate curving portion, fixed on the moving portion, and brought into contact with the first wall, and a second portion which is continuous from the other end portion of the arcuate curving portion, fixed on the second wall, and brought into contact with the second wall, the flexible cable being moved such that the first portion becomes longer and the second portion becomes shorter, or such that the first portion becomes shorter and the second portion becomes longer, due to the movement of the moving portion; and
    a second contact portion on the second wall and in contact with the second portion of the flexible cable, on which the flexible cable slides less smoothly than on the other portion of the second wall.

* * * * *